Patented Sept. 26, 1939

2,174,220

UNITED STATES PATENT OFFICE 2,174,220

ANTIFREEZE COMPOSITION

William R. Canfield, San Diego, Calif.

No Drawing. Application September 6, 1938,
Serial No. 228,574

3 Claims. (Cl. 252—5)

This invention relates to a composition for use in lowering the freezing point of aqueous liquids, and particularly to an antifreeze composition for use in heat-exchange devices such as the cooling system of an automobile or other internal combustion engine, for preventing freezing of the cooling medium in cold weather.

The principal object of the invention is to provide an antifreeze composition which, when added in suitable proportion to water or an aqueous liquid, will greatly reduce the freezing point of the water or aqueous liquid.

A further object of the invention is to provide an antifreeze composition which, in addition to its ability to reduce the freezing point of an aqueous liquid, is also advantageous from the standpoint of its stability under widely varying temperature conditions. A particular advantage of my composition in this connection is that it is not affected by heating the aqueous liquid in which it is dissolved to a high temperature. All of the non-aqueous constituents of my composition have very low vapor pressures at temperatures up to and above the boiling temperature of water, thus avoiding any objectionable loss of any of the constituents by evaporation when the liquid medium is heated to a high temperature.

Another object of the invention is to provide an antifreeze composition which is substantially free from corrosive action on iron or on any of the other metals ordinarily used in cooling systems or other heat-exchange apparatus.

The antifreeze composition according to my invention comprises a mixture of ammonium chloride, sodium carbonate, and a water-miscible polyhydric alcohol such as glycerol (glycerine) or glycol, together with a sufficient proportion of an alkaline reagent to overcome or neutralize the acidity of the mixture when dissolved in water and preferably to make the resulting solution slightly alkaline. In making up the composition, the above constituents are preferably dissolved in water to provide a fairly concentrated solution, and this solution is added, in the desired proportion, to the water or aqueous liquid cooling medium in sufficient proportion to lower the freezing point of the latter to the desired temperature.

The proportions of ammonium chloride, sodium carbonate, and polyhydric alcohol are subject to some variation, as is also the proportion of water used in preparing the solution. I prefer, however, to employ substantially equal proportions of ammonium chloride and sodium carbonate by weight, and to use a proportion of polyhydric alcohol about equal to or somewhat greater than the weight of the ammonium chloride and sodium carbonate combined. For example, the preferred proportions may be substantially as follows:

Ammonium chloride—approximately one part by weight
Sodium carbonate—approximately one part by weight
Polyhydric alcohol—approximately 2¼ to 2½ parts (or say from 2 to 3 parts) by weight
Water—about 4 to 6 parts or more by weight
Sodium hydroxide or other alkaline reagent—sufficient to neutralize the solution and preferably make it slightly alkaline The proportion of water may obviously be increased, although the addition of water in excess of the amount required to ensure complete solution of the other constituents serves to dilute the solution and to increase the proportion thereof which must be added to an aqueous liquid medium to obtain a given reduction of the freezing point, as well as increasing the cost of transportation and storage of the composition.

The proportion of sodium hydroxide or other alkaline reagent required to make the solution neutral and preferably slightly alkaline is dependent upon the specific proportions of the other constituents, and particularly upon the proportions of ammonium chloride and sodium carbonate. Ammonium chloride alone produces an acid reaction, while sodium carbonate alone produces an alkaline reaction. When these two constituents are employed, for example, in approximately equal parts by weight, the solution is somewhat acid, and the amount of sodium hydroxide required to make the solution neutral or slightly alkaline is on the order of one-fifth part by weight, to one part of ammonium chloride and one part of sodium carbonate. The alkaline reagent used for this purpose is one of high solubility in water and which will not form an insoluble precipitate with any of the other constituents of the composition. Such reagent, for example, may be an alkali metal hydroxide, such as sodium or potassium hydroxide, and I prefer to use sodium hydroxide.

In preparing the solution, I prefer to first dissolve the ammonium chloride and sodium carbonate in water, to then add an aqueous solution of alkali metal hydroxide (for example, a solution containing about 10% by weight of sodium hydroxide) in sufficient amount to neutralize the solution or make it slightly alkaline (that is, to provide a pH not less than, and preferably greater than, 7), and then add the polyhydric alcohol. It will be understood, however, that the polyhydric alcohol may be added to the solution of ammonium chloride and sodium carbonate prior to the addition of the alkali metal hydroxide.

The following may be given as a specific example of an antifreeze composition according to this invention and the method of preparing the same:

One pound of ammonium chloride and one pound of sodium carbonate are dissolved in two quarts of water. A sodium hydroxide solution containing one part NaOH to ten parts water is then added in sufficient amount to make the solution slightly alkaline, the amount of such solution ordinarily required for this purpose being approximately one quart. One quart of glycerol is then added and the constituents thoroughly mixed to produce a homogeneous solution.

The addition of the above-described antifreeze composition to water produces a marked lowering of the freezing point, and the resulting solution is substantially non-corrosive to ferrous metals or other metals such as are ordinarily used in heat-exchangers or cooling systems. Furthermore, the solution is not subject to deterioration upon standing and is stable over the entire range of temperatures encountered in practice, and is not subject to loss of any of the non-aqueous constituents by evaporation even when the aqueous liquid containing the added antifreeze solution is heated to boiling.

The extent to which the freezing point may be lowered by the use of different proportions of the composition prepared according to the above specific example is illustrated in the following table, which gives the approximate freezing points of mixtures prepared by adding one part of such composition to water in various proportions by volume:

| Parts of water to one part of antifreeze solution | Freezing point |
|---|---|
| | °F. |
| 8 | +15 |
| 6 | +10 |
| 4 | 0 |
| 3 | −40 |
| 2 | −50 |
| 1 | −55 |

The freezing point of the solution itself, prepared in accordance with the specific example given above, is below minus 65° F.

While the composition described herein is intended particularly for use in automobile cooling systems, it may also be employed in the cooling systems of other internal combustion engines or in any other heat-exchange devices in which it is desired to prevent the freezing of an aqueous medium. Furthermore, it may be used in other cases for preventing freezing, as for the purpose of preventing formation of ice on the wings of an airplane.

The composition also has a very high boiling point, and the addition thereof to water serves to materially increase the boiling point of the aqueous solutions, which remain substantially stable in composition at temperatures up to the boiling point thereof. Consequently, the solution may also be used to advantage in the cooling systems of airplane engines or in other cases where it is desired to utilize an aqueous medium under temperatures above the boiling point of water.

It will be understood that the foregoing description is given merely by way of illustration, and that many variations may be made therein without departing from the spirit of my invention.

I claim:

1. An antifreeze composition having a freezing point below minus 50° F. and consisting essentially of an aqueous solution of the following constituents:

Ammonium chloride—approximately one part by weight

Sodium carbonate—approximately one part by weight

Water-miscible polyhydric alcohol—two to three parts by weight

Alkali metal hydroxide—sufficient to at least neutralize acidity produced by the other constituents.

2. An antifreeze composition consisting essentially of an aqueous solution containing:

Ammonium chloride—approximately one part by weight

Sodium carbonate—approximately one part by weight

Glycerol—2 to 3 parts by weight

Water—approximately 4 to 6 parts by weight

Sodium hydroxide—sufficient to at least neutralize acidity produced by the other constituents.

3. An antifreeze composition having a freezing point below minus 50° F. and consisting essentially of an aqueous solution containing approximately equal parts by weight of ammonium chloride and sodium carbonate, approximately 2 to 3 parts by weight of glycerol to one part of each of the above-named constituents, and sufficient sodium hydroxide to at least neutralize acidity produced by the other constituents.

WILLIAM R. CANFIELD.